UNITED STATES PATENT OFFICE.

WALTER HEINRICI, OF HALLE-ON-THE-SAALE, GERMANY.

STABLE SOLUTION OF HYDROGEN PEROXID AND METHOD OF MAKING SAME.

No. 876,179.  Specification of Letters Patent.  Patented Jan. 7, 1908.

Application filed August 2, 1906. Serial No. 328,90 (Specimens.)

*To all whom it may concern:*

Be it known that I, WALTER HEINRICI, a subject of the Prince of Schwarzburg-Sondershausen, in the German Empire, residing in Halle-on-the-Saale, Prussia, Germany, have invented a new and useful Process of Producing Stable Solutions of Hydrogen Peroxid, of which the following is a full, clear, and exact specification.

This invention relates to a process by which technical solutions of hydrogen peroxid, which, in consequence of the presence of acids, such as sulfuric acid, phosphoric acid, acetic acid, etc., are more stable for practical use than pure solutions, are made more stable. Comparative stability is effected by adding to such acid solutions the organic substances named in my patent No. 825883 July 10, 1906, that is, bodies of the class of the amido derivatives, such as acylamids, acidyl derivatives of the aromatic bases and the acidyl ureas, for instance, acetamid, benzamid, succinimid, phtalimid-acetanilid, acetphenetidid (phenacetin), lactophenin, thymacetin, toluol sulfoacidphenetidid, benzlurea, phenyl-urea, methyluracil.

I have discovered that if a sample of 3 % hydrogen peroxid of commerce (technical product) containing a percentage of acid equal to 3/4 % of sulfuric acid, and a like sample of hydrogen peroxid containing say 1/20 % phenacetin, are preserved for many months under similar conditions, the sample without the addition of phenacetin loses 40 % of its contents of hydrogen peroxid, while the one mixed with phenacetin loses only 8 % of its contents of hydrogen peroxid.

I claim as my invention:

1. A process for increasing the stability of a solution of hydrogen peroxid of acid constitution which consists in adding an organic amido-derivative to such solution.

2. A stable solution of hydrogen peroxid containing free acid and an admixture of organic amido-derivatives, substantially as described.

In testimony whereof I have signed my name to this specification, in the presence of two subscribing witnesses.

WALTER HEINRICI.

Witnesses:
 RUDOLPH FRICKE,
 HERMANN EBER.